United States Patent [19]

Atfield et al.

[11] Patent Number: 4,725,043

[45] Date of Patent: Feb. 16, 1988

[54] WINCH

[75] Inventors: Philip J. Atfield, Emsworth; Richard D. J. Huggett, Horndean, both of England

[73] Assignee: Lewmar Marine Limited, Havant, England

[21] Appl. No.: 889,563

[22] Filed: Jul. 25, 1986

[30] Foreign Application Priority Data

Jul. 27, 1985 [GB] United Kingdom ................. 8519021

[51] Int. Cl.[4] ............................ B66D 1/14; F16H 5/72

[52] U.S. Cl. ...................................... 254/354; 74/812; 254/357

[58] Field of Search ............... 254/342, 344, 354, 357; 74/812

[56] References Cited

U.S. PATENT DOCUMENTS

Re. 30,881 3/1982 Huggett et al. ................. 254/354 X 3,802,665 4/1974 Fawcett .............................. 254/354

3,927,580 12/1975 Fawcett .......................... 254/346 X 3,942,762 3/1976 Reymond ......................... 254/345 X 3,962,935 6/1976 Hutton et al. .................. 254/354 X 3,973,755 8/1976 Fawcett .............................. 254/354

3,981,208 9/1976 Moses ................................... 74/812

*Primary Examiner*—Stuart S. Levy

*Assistant Examiner*—Joseph J. Hail, III

*Attorney, Agent, or Firm*—Cushman, Darby & Cushman

[57] ABSTRACT

A winch has four drive trains of progressively increasing mechanical advantage between its drive shaft (3) and drum (8). If a selector (40) is engaged, rotation of the shaft in successively opposite senses will cause automatically engagement of the first third and fourth trains in sequence. If the selector (40) is not engaged and an override control (80,81,82) is appropriately set, the sequence second, third, fourth trains is followed. But the override may be locked so that only second and third trains are engaged alternately.

8 Claims, 7 Drawing Figures

WINCH

FIELD OF THE INVENTION

The present invention relates to winches of the manually powered type or of the motor powered type.

BACKGROUND OF THE INVENTION

It is now common for such winches, particularly those of the manually powered type, to be provided with a plurality of drive ratios between their drive input and the winch drum. Interchange between the various drive ratios is normally achieved by reversal of the direction of drive input causing an automatic interchange, without reversal of the direction of rotation of the drum.

One common type of winch has three drive ratios of increasing mechanical advantage the lowest being a 1:1 ratio, i.e. a direct drive and the other involving gear trains, with interchange being by reversal of the drive direction as discussed above. However, if the interchange from the ratio of the lowest mechanical advantage to the next ratio up is determined by the relative directions of rotation of drive and drum, there is a risk that the ratio of lowest mechanical efficiency would be disengaged if the drum overruns. Overrunning is a common event, so it is important that this should not change the drive ratio.

In our U.S. patent specification No. 3973755 we disclosed a winch having three drive ratios, the first being a 1:1 ratio, in which the position of a resiliently loaded actuator determined whether the drive shaft of the winch was engaged directly to the drum or was disengaged. The resilient loading normally forced the actuator to its engaged position, but the winch also had a catch on a stationary part of the winch which engaged the actuator only when the actuator moved with the drive shaft in one direction. When this catch engaged the actuator, the actuator was forced from its engaged position, against its resilient loading, to its disengaged position, at which position it was held by a detent. On reaching this position the actuator became disengaged from the catch. Since the catch was on a stationary part of the winch, disengagement occurred only when there was a reversal of rotation of the drive shaft in an absolute sense, not merely relative to the drum. In order to release the actuator from its detent, and so re-engage the 1:1 drive ratio, the disengagement means accessible to the operator was provided on the winch.

When the winch is used with the sheet of a sail of a sailing vessel, the first (1:1) drive ratio is very useful when tacking because it permits the sheet to be tensioned rapidly when the sail is "flogging". In this situation there is virtually no force applied by the sail to the sheet and so it can be pulled easily. Once the tension has been set up in the sheet, reversal of the drive engages the second ratio and the higher mechanical efficiency enables the tension in the sheet to be increased. Finally, a second reversal engages the third ratio and enables the sheet to be pulled to its final position, at which the tension is very high. When the vessel tacks again, the tension is again released and so operation of the disengagement means enables the winch to return to the first ratio.

Such a winch is of less use, however, with a spinnaker. The sheet of such a sail is never slack and so the 1:1 ratio is of little use. Medium and high tension can be handled by the second and third ratios, but for low tensions a ratio with a slightly greater mechanical advantage is needed. Therefore winches are designed to meet this purpose in which all ratios involve direct transmission through gear trains.

Clearly, the ratios of such a winch may be selected to be suitable for a spinnaker, but then the winch is of less use during tacking.

SUMMARY OF THE INVENTION

To overcome this problem the present invention proposes a four speed winch, with the drive speed of the lowest mechanical advantage being a 1:1 ratio. The third and fourth ratios correspond to the usual second and third ratios of a three speed winch and a winch of the present invention permits interchange between the first, third and fourth ratios in a manner generally similar to that disclosed in U.S. Pat. No. 3,973,755/U.K. No. 1486777. However, there is a ratio (the second) with a somewhat higher mechanical advantage than the first, and the winch may be switched so that there can be interchange between the second, third and fourth ratios. Furthermore, since it is rare that a spinnaker exerts very high forces on the sheet, means are provided for locking the interchange mechanism, so that reversal of the direction of drive changes the drive ratios between the second and third only. The idea of a "first speed hold" was first conceived, in the context of a three speed winch, in U.S. Pat. Re. No. 30881/U.K. patent application No. 2061862.

The interchange system between the first, third and fourth ratios may be identical to those used in U.S. Pat. No. 3,973,755/U.K. No. 1486777 and reference is made to that specification for various embodiments of the interchange system. When the second gear is engaged, however, the actuator which, in its engaged position, causes engagement of the first drive ratio, is held in its disengaged position by the detent and therefore the winch can be operated in the second, third and fourth ratios until it is released by the disengagement means.

The system used to cause the system to be held in the second-third only pattern may be similar to that disclosed in U.S. Pat. Re. No. 30881/U.K. No. 2061862. In this case there is a stirrup which engages the drive shaft and is pivotally mounted on the stationary part of the winch, and which may be locked in a position in which the shaft is held so that the normal interchange mechanism cannot operate. The position of the stirrup is controlled by a manually operable control on the stationary part of the winch.

It should be remembered that the third and fourth ratios may correspond to the second and third ratios of a standard winch and so standard drive trains may be used.

An embodiment of the invention will now be described in detail, by way of example, with reference to the accompanying drawings, in which.

Figure 1:
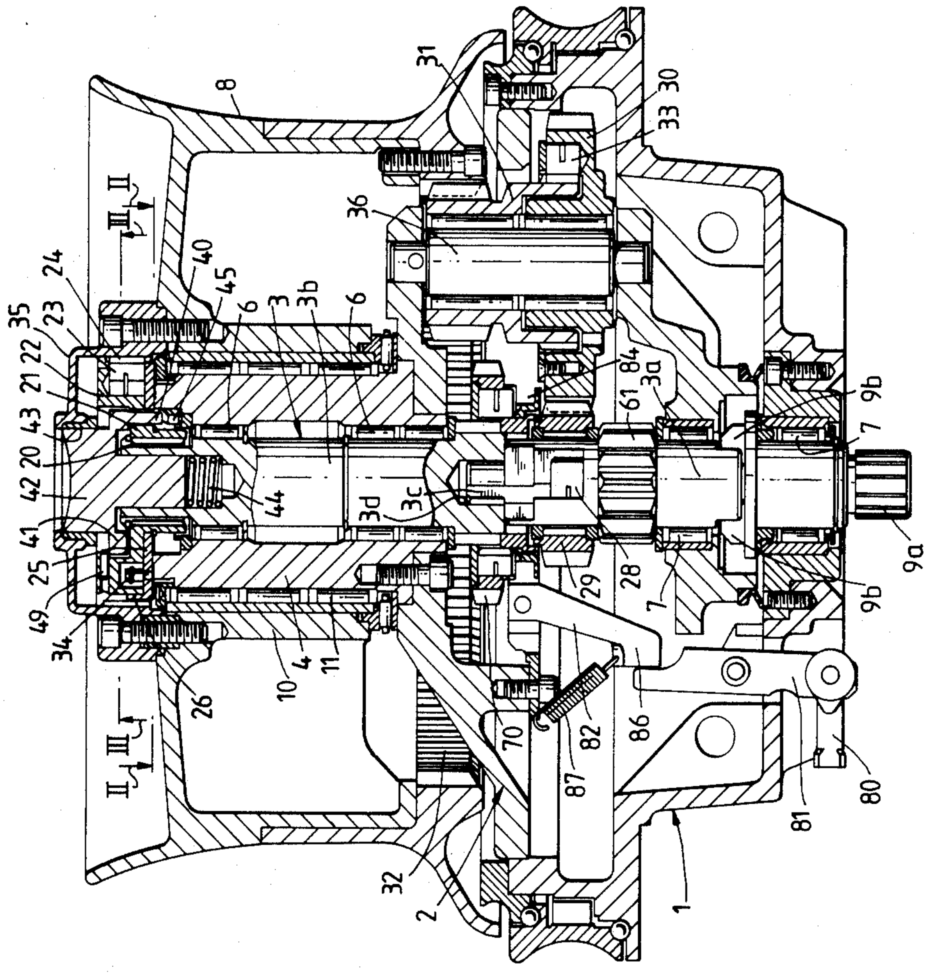
FIG. 1 is a sectional view of part of a winch being an embodiment of the present invention.

Referring first to FIG. 1, a winch has a lower body part 1, in the form of a cup, and an upper body part 2 which form the stationary part of the winch. A drive shaft 3 is supported by the upper and lower body parts 1 and 2, the drive shaft 3 illustrated being in the form of a lower part 3*a* and an upper part 3*b*. Slots 3*c* on a stub of the part 3*b* engage dogs (not shown) on the inner wall of a blind bore 3*d* in the part 3*a*.

The upper body part 2 has a sleeve 4 which surrounds the upper part 3*b* of the drive shaft 3 and rolling bearings 6 permit free rotation of the shaft 3 in the sleeve 4 about a vertical axis. Similarly, rolling bearings 7 permit free rotation of the shaft 3*a* about that axis in thelower body part 1. The sleeve 4 supports a winch drum 8, and it is the drive interconnection between the shaft 3 and the drum 8 with which the present invention is concerned.

In other respects the winch may be wholly conventional. As illustrated the shaft is powered by a manual or motor drive which conncects to the splined portion 9*a* of a separate drive input shaft, linked by lugs 9*b* to diametrically opposed slots in the lower part 3*a* of the shaft 3. However, as will be described later, it is possible to use the present invention in winches in which the drive connection is in the upper part 3*b* of the shaft. The drum 8 has a sleeve 10 which extends coaxially of the sleeve 4 and rolling bearings 11 permit the drum 8 to rotate about the sleeve 4, and hence about the shaft 3 in a manner determined by the various links between drive shaft 3, the body of the winch, and the drum 8. This is conventional, as are the gear trains for the third and fourth gear ratios of the winch as will be described later.

Now description will be made of the interconnection of the first, third and fourth drive ratios. In fact, the arrangement illustrated is very similar to that of the third embodiment of U.S. Pat. No. 3,973,755/U.K. No. 1468777, and reference is made to that specification for the details of construction.

Figure 2:
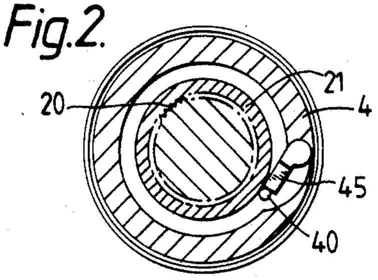
FIGS. 2 to 4 illustrate the mechanism controlling the interchange between the first, third and fourth gears, FIG. 2 being a section on the line II—II in FIG. 1, FIG. 3 being a section along the line III—III in FIG. 1, and FIG. 4 being a sketch of a catch.

Adjacent the top of the shaft 3 is a splined part 20 (FIG. 2) which engages a splined sleeve 21 of a pawl ring 22. Pawls 23 (FIG. 3) are mounted in the pawl ring 22 and pawls 23 are biased outwardly (to the position shown in FIG. 3) by e.g. springs so that they engage with teeth on a ratchet track 24 which is secured to the drum 8. When the pawls 23 are engaged, rotation of the shaft 3 in one direction (clockwise in FIG. 3) causes rotation to be transmitted directly to the drum 8, so that a 1:1 ratio is achieved.

A ring 25 underlies the pawl ring 22 and has an upstanding skirt 26 which surrounds the lower part of the pawl ring 22. Apertures 27 in the skirt are large enough to permit the pawls 23 to project outwardly when the apertures 27 are in the appropriate position (that of FIG. 3), and the ring 25 is biased by a spring anchored to post 34 (FIG. 12) to this position.

Change to the third gear ratio is achieved by reversing the direction of drive. When this happens from the 1:1 drive position, the pawls 23 can pass with only clicking contact over the ratchet track 24, and drive is then passed from the drive shaft to the drum via pawls 28 on the lower part 3*a* of the shaft 3 which engage a gear train 29 and 30, which passes drive to the drum 8 via a final drive gear 31 meshing with a gear ring 32 on the inside of the drum 8. Gears 30 and 31 are both journalled on and are rotatable about shaft 36 borne between the upper and lower stationary parts 1,2 of the winch. A pawl-and-ratchet mechanism 33 disconnects any overrun of the drum from the gear trains.

Figure 3:
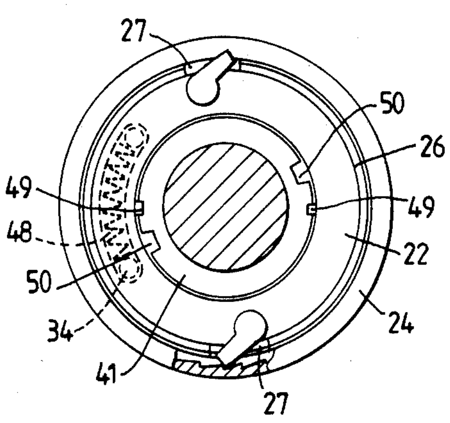

If the pawls remained in the position shown in FIG. 3 with the third gear engaged, a second reversal of the drive shaft 3 would result in re-engagement of the pawls 23 with the ratchet track 24, re-establishing the 1:1 drive ratio.

However, a pin 40 or other abutment (FIG. 4) projects downwardly from a flange 41 of a depressible button 42 on the top of the winch. The button 42 is mounted in a cap 35 on the drum 8 via bushing 43, but is connected to the shaft by a rotatable, spring-loaded connection 44. If the button is depressed, it is rotated relative to the drum by a spring 48 and pins 49 above the flange 41 hold it depressed. When the drum rotates, the button 42, flange 41, and hence pin 40, rotate with it and pass in contact with a pawl 45 pivotable about an axis fixed to the sleeve 4 of the body of the winch, and biased inwardly by a spring 46. When the shaft is rotating with the drum in the 1:1 ratio the pin 40 merely forces the pawl 45 outwardly against the spring 46. However, when the direction of drive is reversed to engage the third gear, the pin 40 comes into contact with the sloping face 47 of the pawl 45. This stops the free rotation of the pin 40 and forces it upwardly; note that this only happens on a reversal of the direction of rotation of the shaft 3 relative to the body of the winch because the pawl 45 is secured to that body. Reversal of the direction of rotation of the shaft 3 relative to the drum 8 on overrun of the drum 8 does not lead to such engagement of pin 40 and pawl 45.

When the pin 40 engages the pawl 45, the rotation of the flange 41, and hence button 42, is arrested and the flange 41 is forced clockwise in FIG. 3. This rotation of the flange 41 is transmitted directly by the pin 40 to the ring 25, causing a similar clockwise movement. The apertures 27 move from the position shown in FIG. 3, and the skirt 26 of the ring 25 causes the pawls 23 to be pushed inwardly. This rotation of the ring 25 is resisted by the spring 48 and that spring is compressed. At one position of the flange 41 after such rotation, projecting pins 49 come into register with recesses 50 in the flange 41 so that the flange 41, and hence the button 42 can rise, when the pin acts against an edge of the recess as a detent to hold the button and hence the ring 25 in position (the position in which the pawls 23 are held out of engagement with the ratchet track 24).

The button 42 is biased upwardly by a spring (forming part of the connection 44). This lifts the flange 41, and hence the pin 40 out of contact with the pawl 45, and the spring in the connection 44 ensures that the button 42 remains in that position.

Thus a maximum of one rotation of the shaft 3 is sufficient to move the ring 25 so that the skirt 26 holds the pawls 23 free from the ratchet track 24, compresses the spring 48, and locks the button 42, and hence the flange 41 and ring 25 in that position by means of the engagement of the projections 49 in the recesses 50.

Figure 7:
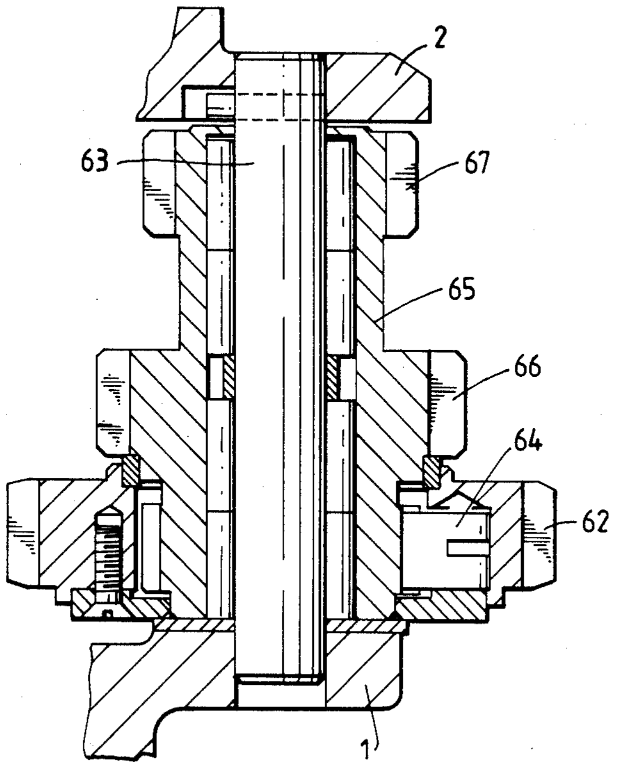
FIG. 7 shows transfer gearing.

Therefore a reversal of the direction of drive from that which engages the third drive ratio does not re-engage the first drive ratio, but instead engages a fourth drive ratio. This is achieved by the action of gear 61 on the lower part 3*a* of the shaft corresponding to the third drive of a standard three speed winch and driving the final gearing through a conventional transfer gear situated out of the plane of FIG. 1 and seen in FIG. 7. Pinion 62 borne on a stationary shaft 63 engages via a unidirectional drive 64 the body 65 of a double gear first teeth 60 of which mesh with gear 30, second teeth 67 mesh with pinion 70 on the main shaft 3. Note that this drive is automatically ineffective when the winch is in the first drive ratio because the drum is moving faster than it would when in the fourth drive ratio, so a ratchet arrangement between part of the fourth drive train and the drum 8 will be in clicking contact only.

To re-engage the first gear, the button 42 is pressed downardly by the operator of the winch until the recesses 50 are clear of the projections 49. Then the flange 41 and hence ring 25 are free to rotate and move anticlockwise under the action of spring 48 to the position shown in FIG. 3. The pawls 23 are then able to project through the apertures 27 in the skirt 26 and so rotation of the shaft 3 in the clockwise sense in FIG. 3 causes direct 1:1 drive to be transmitted to the drum 8.

Figure 4:
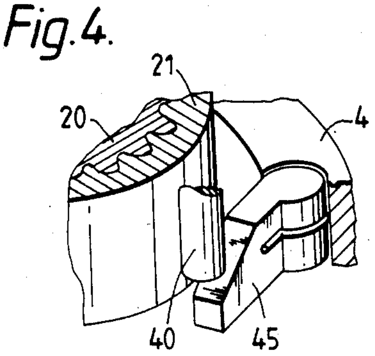

It should be noted that this arrangement of the engagement of the first drive ratio is not the only one possible; alternatively the arrangements of the first and second embodiments of U.S. Pat. No. 3,973,755/U.K. No. 1486777 may be used. Indeed a different arrangement from that shown in the present FIG. 1, for example one as seen in FIG. 4 of the said patent, is essential if the drive to the shaft 3 is to be from the top of the winch.

Thus by initial depression of the button 42 an automatic sequential engagement of first third and fourth drive trains can be assured on sequential reversals of the direction of rotation of the drive shaft 3.

Figure 5:
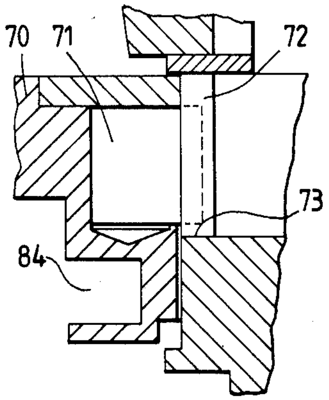
FIGS. 5 and 6 are views of part of FIG. 1, but showing the second ratio gears in other positions.

Alternatively the second drive ratio may be engaged. This drive train originates in a pinion 70 which is coaxial with the drive shaft 3 and axially movable on it. The pinion 70 has pawls 71 mounted on its inner surface and in one axial position of the pinion (the position shown in FIG. 5) these pawls 71 mesh with a ratchet track 72 on the shaft 3. In this position an edge 73 of the shaft 3 below the ratchet track 72 prevents downward movement of the pinion 70 by preventing downward movement of the pawls 71.

The pinion 70 is connected via transfer gear 63 to the final drive gear 30,31 in a way known from G.B. No. 2061862 (in which this second drive ratio corresponds to the drive ratio of lowest mechanical advantage). The configuration of the pawls 71 and the ratchet track 72 is such that the drive is transmitted when the shaft 3 rotates in the same direction as that which corresponds to the first drive ratio. However, if the first drive ratio is engaged, the second drive ratio is disconnected because the relative movement of the shaft and gearing is such that the pawls move in the direction of clicking contact of the pawls 71 and ratchet track 72, since the first drive ratio is of lower mechanical advantage and the drum is moving most rapidly.

Figure 6:
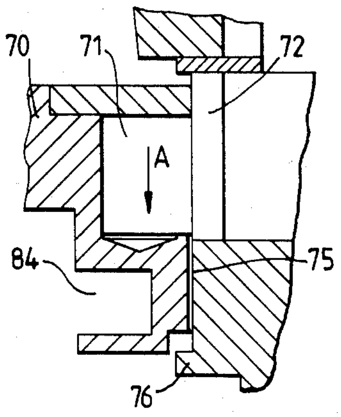

Suppose now the pawls 71 are engaged with the ratchet track 72 and the direction of rotation of the shaft 3 is reversed. Then there is only clicking contact between the pawls 71 and track 72, and the third drive ratio is engaged through gear trains 28, 29 and 30. With the pawls 71 in clicking contact, however, there are positions in which they are clear of the surface 73. The pinion 70 is then free to move downardly (unless supported as will be described later) under the action of gravity. When this happens the pawls 71 come completely clear of the ratchet track 72 and the pawls are held in a withdrawn position by the surface 75 of the shaft 3. The position of downward movement is shown in FIG. 6 (movement of pawl 71 in direction of arrow A). The pinion 70 continues to move downwardly until its lower surface strikes a projecting flange 76 on the shaft, at which point (shown in FIG. 1) it is held. Then reversal of the direction of drive from that activating the third drive ratio causes engagement of the third drive ratio because neither the first nor second drive ratios can be engaged as the corresponding pawls 23 and 71 are held clear of their respective ratchet tracks 24, 72.

Re-engagement of the second drive ratio is achieved by means of a control knob 80 connected to a lever 81 which abuts against a second lever 82, is in turn connected to a yoke which has parts which engage the channel 84 in the pinion 70. When the knob 80 is moved to the left in FIG. 1, the first lever 81 pivots about its fulcrum 85 and pushes the end 86 of the second lever 82 to the right against the force of a spring 87. The movement of the second lever 82 raises the yoke 83, and hence the pinion 70 until the pawls 71 are clear of the surface 75 of the shaft 3 and can re-engage the ratchet track 72.

The knob 80 may then be released and the spring 87 urges the second lever 82 to the left tending to lower the yoke 83. However, while clockwise rotation continues neither the yoke nor the pinion 70 can fall because the pawls 71 abut against the surface 73 of the shaft as described earlier. If it is wished to work only in second and third drives and prevent a second reversal from causing engagement of the fourth drive, means are provided to lock the knob 80 in the position in which the yoke 83 is in its raised position. Then, when the third drive ratio is engaged (by reversal of the direction of drive from that which corresponds to the first and second drive ratios) the pinion 70 cannot fall and so the pawls 71 remain in alignment with the ratchet track 72, and so another reversal ofthe direction of drive re-engages the second drive ratio.

Thus the system may operate with interchange from the second, third, and fourth ratios being by successive reversals of the direction of drive, or may be locked by means of the control 80 acting on the pinion 70 so that the reversals cause switching between the second and third ratios only.

To re-engage the first drive ratio the button 42 is depressed which releases the pawls 23 as described earlier. This may even be done while second ratio is engaged, provided there is little or no load on the drum.

Therefore a four speed winch according to the present invention has many possible drive sequences upon successive drive reversals e.g. automatically sequencing first to third to fourth; automatically sequencing second to third to fourth; automatic exchange of second and third only; manual engagement of first while second is engaged. Clearly there is some slight problem in switching from the first to second drive ratios as the third drive ratio must first be disengaged to lock the pawls which transmit the first drive ratio clear of their ratchet track, but in practice this causes little difficulty as the situations where the first drive ratio is needed are usually very different from those where the second drive ratio is needed and rapid change-over is unnecessary. However, it would be possible to provide some linking between the control knob 80 and the mechanism of the pawls 23 so that actuation of the knob 80 automatically withdrew and locked the pawls 23, but this would be more complicated than the embodiment illustrated and this facility is unlikely to be of practical worth.

It is clear that for particular applications the second speed hold control 80 may be brought out to the side of the winch above deck level as in U.S. Pat. Re. No. 30881/ U.K. No. 2061862 and that other drive input arrangements, manual or motor-driven, may be used.

We claim:

1. A winch having a rotatable drum and a rotatable drive inlet and a plurality of drive trains for transmitting drive from said inlet to said drum, the said plurality comprising first second third and fourth drive trains of respectively increasing mechanical advantage, means for causing transmission of drive through one of the sequences of drive trains: first third and fourth, and second third and fourth, responsive only to successive reversals of direction of rotation of the drive inlet; and means for selecting which one of said sequences is to be followed.

2. A winch as claimed in claim 1 wherein said winch includes means for overriding the automatic change from third to fourth in said second sequence.

3. A winch as claimed in claim 1 wherein the first drive train has a 1:1 drive ratio between the inlet and the drum.

4. A winch as claimed in claim 1 wherein the selected one of said sequences is followed automatically upon successive reversals of direction of rotation of the drive inlet, said overriding means including a lock activatable to hold a train-changing member in a first condition upon a first reversal of the direction at the drive inlet whereby upon a second reversal of direction at the drive inlet drive transmission is via said second train.

5. A winch with a plurality of drive trains of different drive ratio between a drive inlet and a drum of the winch, and means for causing an automatic sequence of said plurality of drive trains of progressively increasing mechanical advantage to be engaged in response only to sequential reversals of direction of drive of said drive inlet, said sequence comprising at least a first third and fourth drive trains, and overriding means operable for overriding said automatic sequencing from said third to said fourth drive trains whereby a reversal of direction of said input drive causes engagement of a second drive train of the plurality of drive trains.

6. A winch as claimed in claim 5 wherein said overriding means holds said second drive train in engagement until deselected whereby successive reversals of input drive automatically successively engage second and third drive trains only.

7. A winch as claimed in claim 5 wherein said overriding means comprise a control member operable to hold in one position a pinion slidably mounted on the shaft and in said one position engageable to the shaft through a unidirectional drive whereby said pinion forms a drive-transmission element between said shaft and the drum.

8. A winch as claimed in claim 5 wherein said first drive train is a 1:1 drive train.

* * * * *